No. 821,234. PATENTED MAY 22, 1906.
E. H. GLANZBERG.
APPARATUS FOR LUBRICATING THE BARREL WHEEL BEARINGS OF BARREL GIG MILLS.
APPLICATION FILED NOV. 29, 1904.

Witnesses:
Arthur Juniper
William Schulz

Inventor:
Ernst Hermann Glanzberg
by Hauk v. Briesen Atty

UNITED STATES PATENT OFFICE.

ERNST HERMANN GLANZBERG, OF MÜNCHEN-GLADBACH, GERMANY, ASSIGNOR TO FRANZ MÜLLER, OF MÜNCHEN-GLADBACH, GERMANY.

APPARATUS FOR LUBRICATING THE BARREL-WHEEL BEARINGS OF BARREL GIG-MILLS.

No. 821,234. Specification of Letters Patent. Patented May 22, 1906.

Application filed November 29, 1904. Serial No. 234,729.

*To all whom it may concern:*

Be it known that I, ERNST HERMANN GLANZBERG, a subject of the German Emperor, residing at München-Gladbach, Germany, have invented new and useful Improvements in Apparatus for Lubricating the Barrel-Wheel Bearings of Barrel Gig-Mills, of which the following is a full and complete specification.

The lubrication of the barrel-wheel bearings of barrel gig-mills, which are connected by suitable oil-pipes, is at present effected either by consistent grease or oil from a closed annular grease-box in the barrel-hub. If consistent grease be used, the feed to the bearings may by the exercise of pressure on the cups on the lid of the grease-box be regulated to a certain extent; but the efficiency of these means is entirely dependent on the attention of the attendant. If, however, oil is used as being more suitable for insuring smooth running in view of the large number of revolutions performed by the cogging-rolls, it is impossible with any existing apparatus to attain an exact and regular feed of oil to the wheel-bearings. The grease-boxes, which are tightly closed on the outside and partly packed with felt, are filled with oil at intervals of, say, two to three days. Now after each replenishment too much oil escapes through the wick or tow-filled oil-pipes, (besides being exhausted in larger quantities by the rotation of the barrel,) thence through the bearings, and finally lost. After a time the quantity of oil in the lubricator diminishes, of course, the lubrication of the bearings diminishing in proportion till finally the accumulation of oil in the felt and wicks is totally exhausted, with a consequent insufficient lubrication. Not only is too much of the lubricant wasted while the chamber is full and the machine in motion, but while it is at a standstill it trickles through the pipes which have a downward inclination and runs off unused.

The present invention, then, is an apparatus to entirely avoid this waste of oil.

It is shown on the accompanying drawings, in which—

Figure 1:
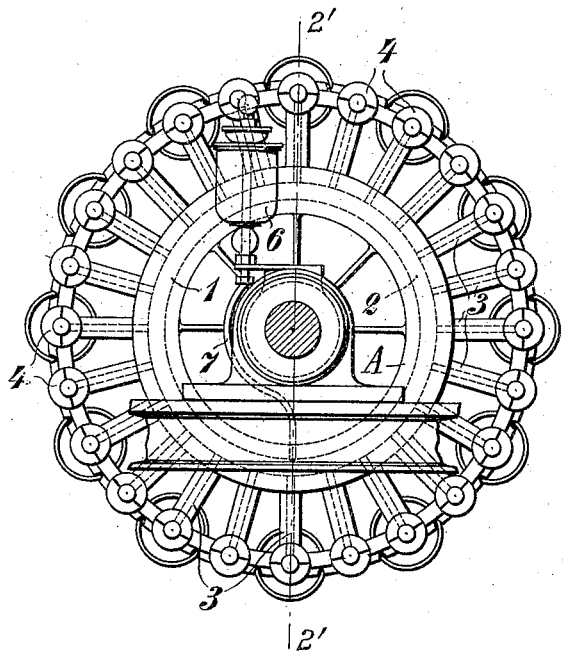
Figure 2:
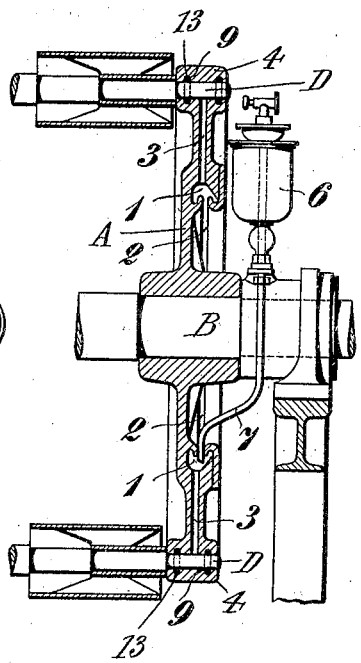

Figure 1 is a side view, partly in section, of a barrel which embodies my invention; Fig. 2, a vertical section on line 2' 2', Fig. 1; and Figs. 3 to 5 are similar sections, partly broken away, of modifications of the invention.

Figures 3, 4, 5:
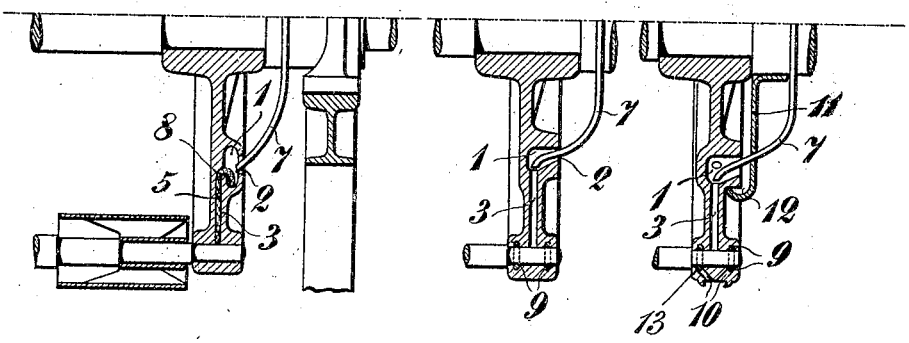

The body or web A of the barrel-wheel is provided with an annular oil-chamber 1, furnished with an annular slot 2, opening either toward shaft B, Fig. 2, or laterally, Figs. 3 to 5. The chamber 1 communicates with the bearings 4 of the barrel-spindles D by ducts or pipes 3. The interior of these radially-arranged pipes may either be left free or filled out with wicks 5. The chamber 1 being open, oil may be replenished while the machine is in motion. In consequence not only may the oil be carried to the bearings 4, which are formed in the wheel at equal distances from its axis in quantities sufficiently small to insure its economical use, but a gravity-feed may be attained to exactly equal the consumption. It is then advisable to attach an easily-accessible lubricator or oil-cup 6 with a reed or pipe 7, carrying the oil to the chamber 1. In the drawings a gravity-lubricator is shown. In place of this, however, any other kind of regulable lubricator or oil-pump may of course be used. When the machine is stationary, this gravity-lubricator is closed by shutting off the air or escape cock. This may be effected automatically on starting or stopping the machine. It will thus be seen that the new construction precludes the waste of lubricant which at present takes place and that the bearings are uniformly greased. If wicks be employed, those parts which lead to the chamber 1 may be bent over, as shown in Fig. 3, so that their ends are again turned outward and dip into the annular groove containing the oil. This arrangement prevents too great a quantity of oil from getting into the bearings, even when by any chance a large quantity should be introduced into the oil-pipes. By centrifugal force the oil is forced toward the periphery of the groove 1, so that to get into the pipes 3 it must first pass the bend 8. It is clear that the centrifugal force acting against the rising of the oil the latter can pass only in small quantities, its power to pass being dependent on the size of the bend or on the depth of the groove 1. At the bearings 4 there is a contrivance which prevents the lateral escape of the oil should by any chance too much be introduced and reach the bearings. In these bearings there are grooves 9, in which felt rings, wicks, or similar substances 13 are inserted, so inclosing the space between the gudgeon and bearings and partially absorbing the oil. In the construction shown in Fig. 5 ducts 10 are provided, that communicate with the grooves 9. These ducts deflect the oil that may accidentally escape in any desired direction to clear the belts and other objects. To prevent the admission of dirt and other foreign bodies into the oil-chamber 1, a special stationary lid 11, Fig. 5, may be attached, having, if necessary, at its bottom or all the way round a tray or trough 12 to catch any stray drops of oil which might happen to drop off. The lid or cover 11 is stationary and does not participate in the rotatory movement of the wheel, which it engages with its curved rim 12.

Having now fully described my invention, what I claim as new, and desire to secure by Letters Patent, is—

1. A barrel-wheel for gig-mills provided with a laterally-open annular lubricating-chamber, radial ducts entering said chamber, a series of journal-bearings communicating with said ducts, and means for supplying a lubricant to the open chamber, substantially as specified.

2. A barrel-wheel for gig-mills provided with a series of grooved journal-bearings, an absorbent within the grooves of the bearings, and deflecting-ducts communicating with said grooves, substantially as specified.

Signed by me at the American consulate, Düsseldorf, Germany, this 12th day of November, 1904.

ERNST HERMANN GLANZBERG.

Witnesses:
PETER LIEBER,
WILLIAM ESSENWEIN.